United States Patent [19]

Rumsey

[11] 4,022,411
[45] May 10, 1977

[54] SELF-LEVELLING SEAT SUSPENSION SYSTEM FOR VEHICLES

[75] Inventor: Thomas R. Rumsey, Buena Park, Calif.

[73] Assignee: Royal Industries, Inc., Compton, Calif.

[22] Filed: June 27, 1975

[21] Appl. No.: 591,021

[52] U.S. Cl. .............................. 248/400; 248/401
[51] Int. Cl.$^2$ ........................................ A45D 19/04
[58] Field of Search .......................... 248/399–403; 297/344–347

[56] References Cited

UNITED STATES PATENTS

| | | | |
|---|---|---|---|
| 2,880,782 | 4/1959 | Conner | 248/399 |
| 2,961,033 | 11/1960 | Galbraith | 248/378 |
| 3,100,101 | 8/1963 | Trevaskis | 248/400 |
| 3,218,020 | 11/1965 | Rhodes | 248/401 |
| 3,343,775 | 9/1967 | Stephenson | 248/400 |
| 3,593,953 | 7/1971 | Auer | 248/400 |
| 3,632,077 | 1/1972 | Hall | 248/400 |
| 3,661,176 | 5/1972 | Lowe | 248/400 |
| 3,758,064 | 9/1973 | Sawaki | 248/400 |
| 3,951,373 | 4/1976 | Swenson et al. | 248/400 |
| 3,954,245 | 5/1976 | Costin | 248/400 |

FOREIGN PATENTS OR APPLICATIONS

| | | | |
|---|---|---|---|
| 1,089,285 | 9/1960 | Germany | 248/400 |
| 1,655,548 | 7/1970 | Germany | 248/400 |

*Primary Examiner*—Lawrence J. Staab
*Attorney, Agent, or Firm*—Sellers and Brace

[57] ABSTRACT

A self-levelling seat suspension system for vehicles wherein the seat is reciprocally supported by a cushion of pressurized air interposed between the seat and its supporting base unit. Pressurized air is supplied to or vented from the air cushion by a level control valve bodily movable with the seat and relative to an actuating cam. By way of example, the level control valve is fixed to one of a pair of links hingedly connecting the seat and its base and serving additionally to restrain the seat from rotation about its axis of reciprocation. The control valve is actuated by a cam which is manually adjustable to support the seat in any one of several different neutral levels while the occupant is seated.

12 Claims, 7 Drawing Figures

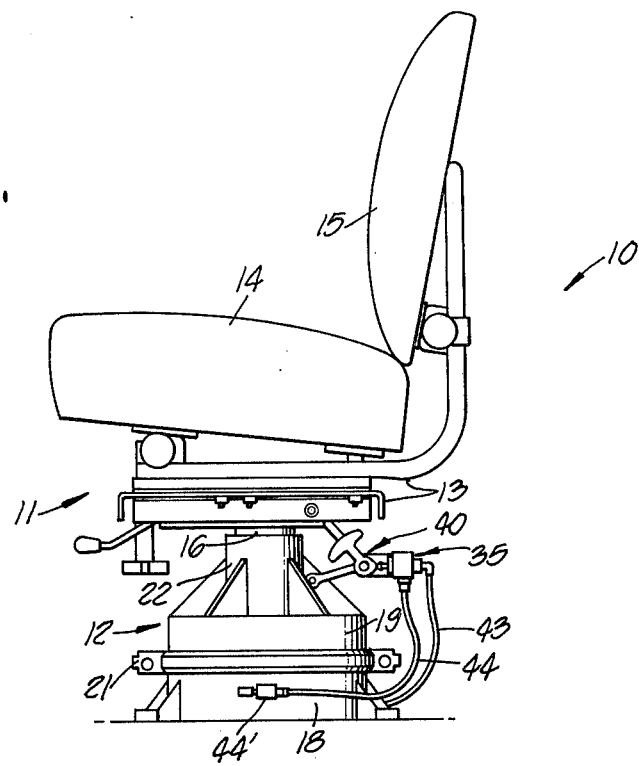
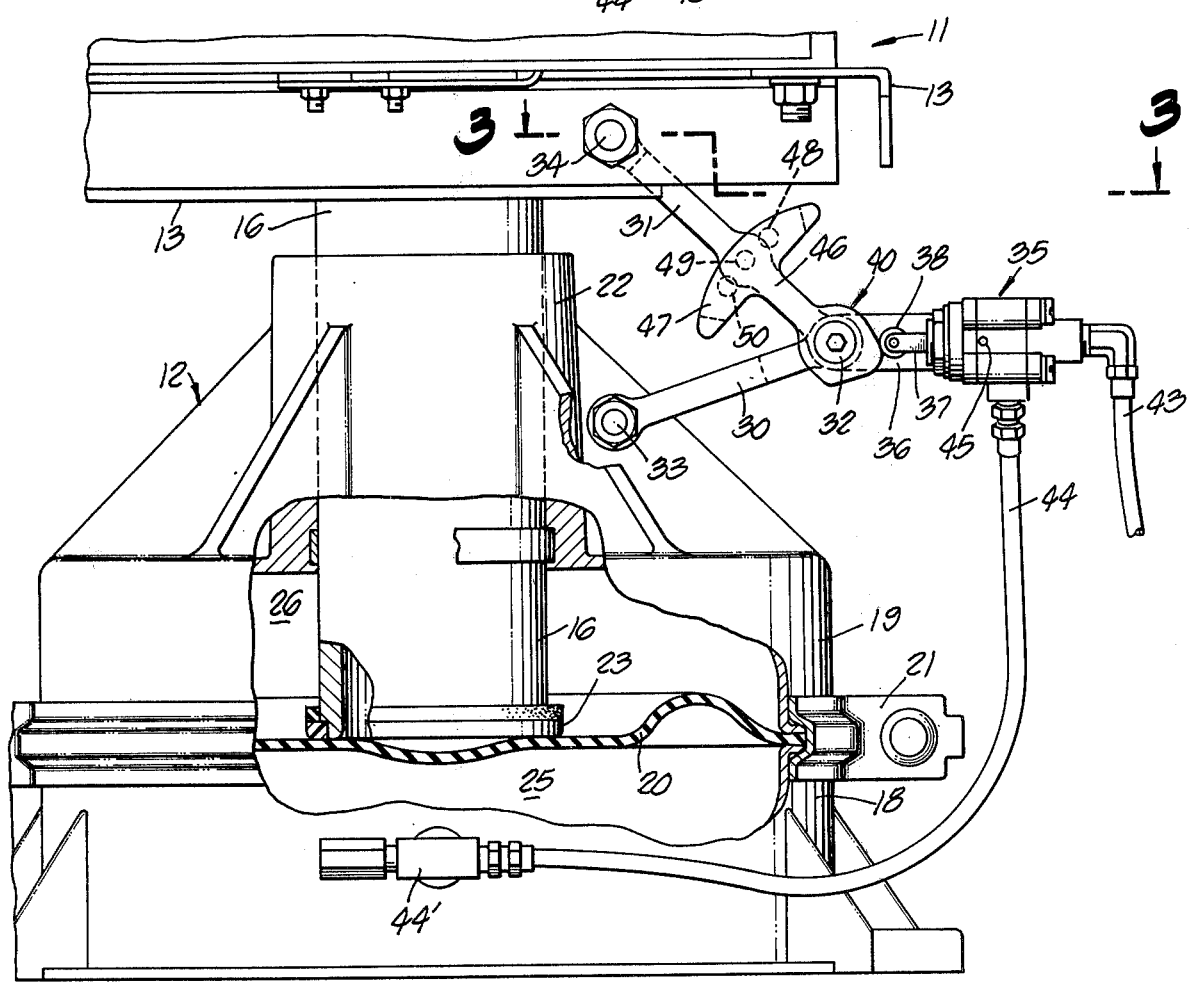

SELF-LEVELLING SEAT SUSPENSION SYSTEM FOR VEHICLES

This invention relates to a seat for a vehicle operator, and more particularly to an improved ruggedly constructed air supported seat of unique design utilizing a level control valve for supplying pressurized air to and venting air from a supporting air cushion.

The operators of a wide variety of both off-the-road and on-the-road vehicles have need for specially constructed seats for their comfort and well being, as well as to avoid premature fatigue, increase their driving efficiency, improve their alertness and attain various other benefits. The great majority of these prior proposals endeavor to achieve these benefits using various pneumatic expedients for resiliently supporting the seat proper. Certain of these proposals utilize a seat having a piston secured to its bottom and reciprocable against a body of air whereas others employ parallelogram linkage assemblies between the seat and the supporting base in combination with a pneumatic cylinder aor bellows charged with pressurized air. Certain of these prior designs utilize manually operated pumps for pressurizing the air chamber whereas others have provision for supplying pressurized air to the air chambers by means of a wide assortment of valves, check valves and pressure relief valves. These prior constructions also include means for adjusting the normal seat height to different positions to accommodate operators of different heights and weights. However, all of these prior constructions are subject to numerous disadvantages and shortcomings avoided by the present invention. These disadvantages and shortcomings are due in major part to the complexity and multiplicity of moving parts provided in prior constructions with attending high manufacturing, service and maintenance costs.

The present invention is characterized by its simplicity, ruggedness, and the use of a single moving part quickly adjustable by the operator while seated to support the seat in a selected different elevation to accommodate the wishes of a particular seat occupant. The suspension system comprises a seat unit reciprocally supported by a cushion of pressurized air and normally maintained in a neutral position by a level control valve supported on a hinging linkage interconnecting the seat and base units. A single cam carried by this linkage senses changes in the position of the seat in response to irregularities in the roadway and adjusts the control valve to supply compensating pressurized air to the air cushion or venting air therefrom as necessary to provide a soft ride for the seat occupant and to restore the seat to its neutral position. The control valve is mounted directly on the linkage and includes a single moving part cooperating with a control cam. The latter is adjustable about its axis to vary the neutral level of the seat at the option of the seat occupant. The seat unit includes a piston reciprocally mounted within a bearing forming part of the base unit with its lower end resting on an air cushion located in the base unit. The linkage interconnecting the seat and base units not only senses irregularities in the roadway but conveys these to the actuator of the level control valve. This linkage serves additionally to prevent rotation of the seat about its reciprocating axis. The level control valve is rigidly connected to one of the links with the axis of its valve movement traversing the cam axis thereby permitting the neutral height of the seat to be adjusted simply by rotating the cam through a small arc about its own axis.

These and other more specific objects will appear upon reading the following specification and claims and upon considering in connection therewith the attached drawing to which they relate.

Referring now to the drawing in which a preferred embodiment of the invention is illustrated.

FIG. 1 is a side elevational view of an illustrative embodiment of the invention seat suspension system;

FIG. 2 is a side elevational view on an enlarged scale of the lower portion of FIG. 1 with portions of the parts broken away to show constructional details;

Figure 3:
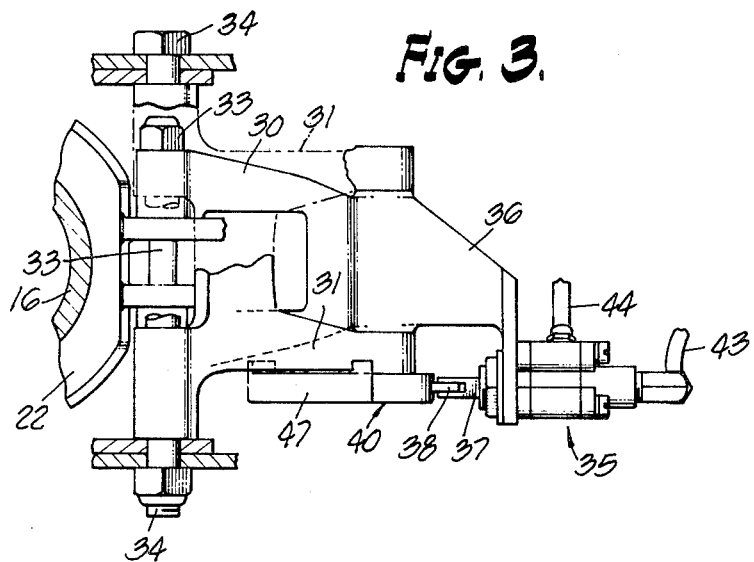
FIG. 3 is a fragmentary cross-sectional view taken along line 3—3 on FIG. 2.

Referring initially more particularly to FIG. 1, there is shown the invention vehicle seat suspension system, designated generally 10, comprising the seat unit 11 recprically supported on a base unit 12 securable to a vehicle floorboard or the like. Seat unit 11 is of any suitable construction comprising a main frame 13, a seat cushion 14 and a backrest 15. Projecting downwardly from and rigidly secured to seat frame 13 is a supporting shank or piston 16.

As is best shown in FIG. 2, base unit 12 comprises a pair of generally cup-shaped housing members 18 and 19 facing toward one another and having annular lips between which is clamped the peripheral edge of a strong flexible diaphragm 20 by a clamping band 21. The seat piston 16 projects downwardly through an upright tubular bearing 22 forming part of the cup-shaped member 19. Mounted on the lower end of piston 16 is a non-metallic thrust bearing 23 which rests directly against the upper central portion of diaphragm 20. The air cushion chamber 25 underlying diaphram 20 is closed to the atmosphere whereas the upper chamber 26 may be vented to the atmosphere in any suitable manner. Preferably however, the loose sliding fit between bearing 22 and piston 16 provides an adequate passageway for air entering or leaving the upper chamber 26 in response to reciprocation of the seat on the air cushion 25.

Figure 4:
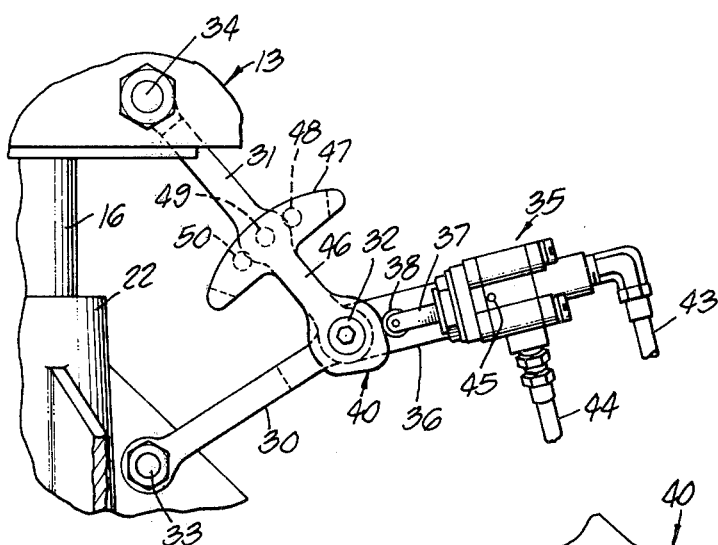
FIG. 4 is a fragmentary elevational view of the torque linkage and the level control valve with the seat supported near an extreme upper position in which air is being vented rapidly to the atmosphere from the air cushion.

Suitable means for automatically controlling the air pressure in cushion 25 comprises a pair of torque control links 30,31 having their adjacent ends pivotally interconnected at 32 (FIG. 4). As here shown by way of example, both ends of lower link 30 are bifurcated and its lower end is pivotally connected to base unit 12 by bolt 33. Likewise, the overlying bifurcated end of upper link 31 is pivotally connected to frame 13 of the seat unit by bolt 34.

A conventional level control valve 35 of well known construction is rigidly secured to the outer end of an L-shaped bracket 36 cast integral with lower link 30 as is best shown in FIG. 3. Reciprocally supported in the housing of valve 35 is a valve actuator 37 supporting a cam follower roller 38 on its outer end. This roller 38 bears against the peripheral edge of the control cam 40 which is here shown as journalled on pin 32 interconnecting the adjacent ends of the torque links 30,31.

Valve 35 is connected to a source of pressurized air on the vehicle by a pressurized air supply hose 43. A second flexible hose 44 extends from the valve housing through a pressure relief valve 44' into the air cushion chamber 25. A suitable setting for relief valve 44' is of the order of 18 psi.

Level control valve 35 utilizes a valve actuator 37 spring biased outwardly to hold the cam follower roller 38 in firm contact with the surface of cam 40. Typically, the actuator has a short range of movement intermediate the ends of its full operating range in which is neither vents nor admits additional pressurized air to the air cushion. However, if actuator 37 is shifted to the right beyond this short range, as viewed in the several views of the drawing, it is effective to unseat a valve to admit pressurized air from line 43 into line 44. On the other hand if actuator 37 is shifted to the left beyond the other end of this short range or neutral position, it unseats a venting valve to release pressurized air from cushion 25 to the atmosphere via hose 44 and venting orifice 45 in the sidewall of valve 35.

Figure 7:
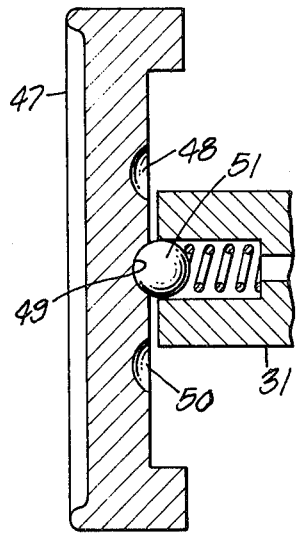
FIG. 7 is a cross-sectional view on an enlarged scale and showing means for holding the cam selectively in different adjusted positions.

Cam 40 is rotatable through a small arc about pin 32 interconnecting torque links 30,31 thereby to adjust the cam surface relative to roller 38 when it is desired to adjust seat 11 to a different operating level. Cam 40 is held in a selected adjusted position by a T-shaped lever arm 46 the T-head portion 47 of which is provided on its inner side with several recesses 48,49,50 providing a seat for a spring pressed ball detent 51 mounted in a well in the side of torque link 31. These structural details are best shown in FIG. 7. As shown in the several drawing views, cam 40 is in its intermediate position with ball 51 seated in detent 49 thereby to support seat unit 11 at an intermediate level above the base unit. If the control lever 46,47 is rotated counterclockwise about pin 32 until ball 51 is seated in detent 48, seat unit 11 will automatically come to rest in a neutral position at a somewhat higher level, whereas, if the cam is adjusted to the third position in recess 50, the seat unit will come to rest in a neutral position at its lowermost level. Although only three positions of adjustment are shown, it will be understood that any desired number of additional positions may be provided simply by increasing the number and spacing of the ball detent recesses 48,49,50.

Figure 6:
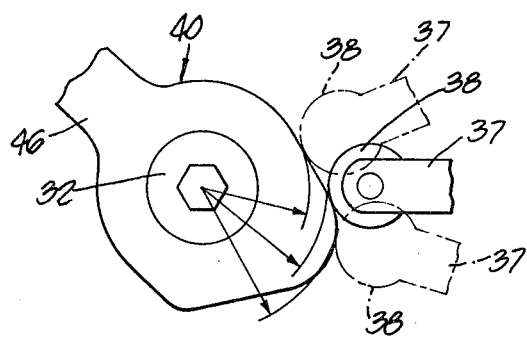
FIG. 6 is a fragmentary side elevational view of the cam controlling the level control valve and representing several different positions of the valve actuator relative to the cam.

Referring now more particularly to FIG. 6, there is shown in a somewhat exaggerated form the contour of the cam surface in contact with roller 38. In the full line position, actuator 36 is in its neutral position wherein the seat unit is supported by air cushion 25 at a stable level. So long as valve actuator 37 is in its neutral position to trap pressurized air no air can escape through vent port 45 and no additional pressurized air can center the cushion. Let it now be assumed that the vehicle hits a bump causing the vehicle chassis to rise. As this occurs the weight of an operator causes the seat to reciprocate toward the base unit thereby rotating cam 40 counterclockwise about pivot pin 32 thereby causing cam follower roller 38 to engage a portion of the cam surface of greater radius. This shifts actuator 37 to the right to open the air supply valve and admit additional pressurized air from supply hose 43 for flow to the air cushion through hose 44. The additional pressurized air admitted to the cushion counteracts the downward movement of the seat unit. If the additional air admitted to the cushion acts against diaphragm 20 and piston 16 to elevate the seat, as links 30,31 open and cam 40 rotates clockwise thereby permitting roller 38 to roll along a portion of the cam surface of shorter radius as diagrammatically illustrated in FIG. 6. As soon as the valve actuator 37 moves slightly outwardly from the valve housing it first closes the pressurized air admitting valve, if open, and, upon further outward movement, opens the venting portion of the valve to vent pressurized air from the air cushion to the atmosphere. The release of some pressurized air permits the seat to return toward its neutral position while reclosing the venting valve. This up and down movement of the seat may be repeated one or more times but, in the absence of further road irregularities the seat quickly comes to rest at its preselected neutral level with a predetermined quantity of pressurized air trapped in the air cushion 25.

Figure 5:
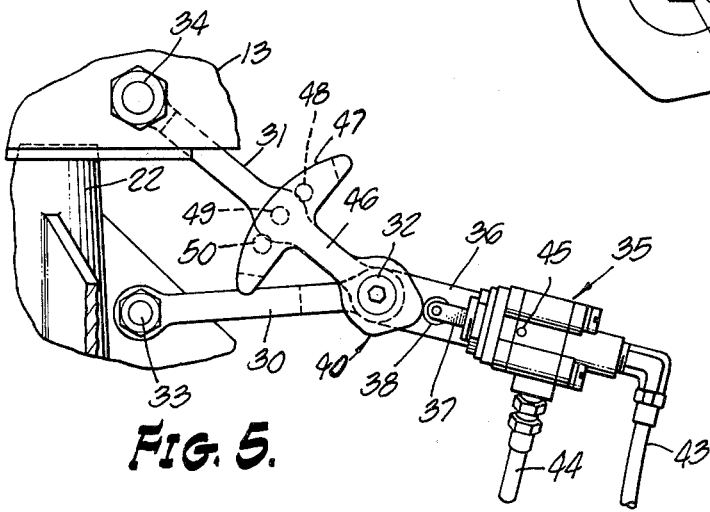
FIG. 5 is a view similar to FIG. 4 but showing the seat near its extreme lower position with the valve positioned to admit pressurized air to the air cushion.

FIGS. 4 and 5 represent extreme upper and lower limits of the seat movement which extreme limits are seldom if ever encountered in actual operating practice, but are included as an aid to understanding the operation of the device and to make clear that the level control valve 35 is bodily movable because mounted on mounting bracket 36 forming an integral extension of torque link 30. Cam 40 however moves with the upper link 31 causing its cam surface to rotate in an arc in contact with the follower roller 38.

It will be understood that the seat unit remains at a selected height whether or not occupied by an occupant. Thus let it be assumed that the driver leaves the seat. Normally, at this time the seat is in its neutral position for the adjusted position of the seat height adjusting lever 46,47. Accordingly, at this time, the actuator 37 is in its neutral position and the pressurized air is trapped in cushion 25. Accordingly, when the rider leaves the seat the air admission valve and the venting valve within valve 35 are both closed. If for any reason the removal of the operator's weight from the seat causes the trapped air to elevate the seat, this merely permits some air to be vented to the atmosphere until the seat unit settles until the venting valve closes as the seat reaches its preselected neutral position. If on the other hand the weight of the next occupant of the seat causes the seat to settle, valve 35 operates immediately to admit sufficient pressurized air to restore the seat to its selected neutral level where it will remain until the vehicle hits a bump and initiates another operating cycle of the level control mechanism.

If the occupant of the seat wishes to adjust the seat height to a different level, he simply grasps the operating cam lever 47 and rotates it through a short arc either upwardly or downwardly. This changed position of the cam surface relative to the cam follower immediately causes the valve actuator to either admit pressurized air or vent pressurized air from the cushion until the seat comes to rest at the selected new elevation with the valve actuator 37 in the same neutral position as formerly. It follows from the foregoing that actuator 37 and cam follower roller 38 always operate over substantially the same peripheral area of cam 40 regardless of the seat level selected by a particular driver. It is also pointed out that, as herein shown and preferred, the reciprocating axis of the valve actuator 37 always passes through the axis of pin 32 interconnecting a torque links 30,31.

While the particular self-levelling seat suspension system for vehicle herein shown and disclsed in detail is fully capable of attaining the objects and providing the advantages hereinbefore stated, it is to be understood that is is merely illustrative of the presently preferred embodiment of the invention and that no limitations are intended to the detail of construction or design herein shown other than as defined in the appended claims.

I claim:

1. In combination, a vehicle seat suspension system of the type having a base unit reciprocally supporting a seat unit on an air cushion therebetween, duct means for supplying pressurized air to said air cushion, torque control linkage means interconnecting said seat and base units to prevent relative rotation thereof and including at least one pair of pivotally connected links, level control means carried by one of said links for controlling air flow along said air duct means, said valve means having actuator means for controlling the flow of pressurized air to said air cushion and for venting air therefrom and normally in the closed neutral position thereof thereby to trap a charge of pressurized air in said air cushion irrespective of whether or not said seat is occupied by a passenger, and means movable with the other of said pair of links and operatively associated with said valve actuator means and responsive to movement of said seat unit in either vertical direction away from said neutral position to admit additional pressurized air to said air cushion and to vent pressurized air therefrom depending on whether said seat unit moves downwardly or upwardly relative to the normal neutral position of said seat unit.

2. The combination defined in claim 1 characterized in that said means responsive to movement of said seat unit to operate said actuator means comprises cam means movable with said other one of said pair of links and thereby effective to shift said valve actuator means as said seat unit moves toward and away from the neutral position thereof.

3. The combination defined in claim 2 characterized in the provision of means for adjusting said cam means to a plurality of different positions relative to said valve actuator means each effective in cooperation with said level control valve means to support said seat unit at a different neutral level relative to said base unit.

4. The combination defined in claim 3 characterized in that said cam means is journalled about a pivot axis of said torque control linkage means.

5. That improvement in a vehicle seat suspension system of the type having a base unit and a seat unit reciprocally supported thereon by a cushion of pressurized air which pressurized air is automatically augmented or diminished by level control means for the air supply to said air cushion as a vehicle equipped with said seat unit suspension system passes over rough ground, said improvement comprising: torque control linkage means including a plurality of links pivotally connected together in series and having their remote ends connected respectively to said base unit and to said seat unit and cooperating to hold said units against relative rotary movement while permitting said seat unit to reciprocate vertically against said air cushion, said level control valve means being fixed to a first link of said linkage means and having a valve actuator operatively associated with cam means mounted on a second one of said links and movable relative to said first link as said seat unit reciprocates against said air cushion thereby to operate said valve means to admit pressurized air to said air cushion when said seat unit moves upwardly from the normal neutral position thereof and to vent air to the atmosphere from said air cushion when said seat unit moves downwardly from the normal neutral position thereof.

6. That improvement defined in claim 5 characterized in the provision of readily adjusted means for supporting said cam means selectively in one of a plurality of different positions each effective in cooperation with said level control valve means to support said seat unit and an occupant thereof at a selected different neutral level.

7. That improvement defined in claim 6 characterized in that said cam adjusting means is positioned for convenient access and adjustment by manual manipulation by the occupant of said seat unit.

8. That improvement defined in claim 5 characterized in that said cam means is mounted for relative rotary movement about one pivot axis of said linkage means and thereby effective in cooperation with said valve means to support said seat unit at a selected neutral level irrespective of whether said seat is occupied by a passenger.

9. That improvement in a vehicle seat suspension system of the type having a seat unit reciprocally supported by a base unit on a cushion of pressurized air and which pressurized air is automatically augmented or diminished by level control valve means located in the pressurized air supply to said air cushion as a vehicle equipped with said suspension system passes over rough ground, said improvement comprising: linkage means including a pair of rigid links pivotally interconnected between their adjacent ends and having their remote ends pivotally connected respectively to said base unit and to said seat unit, duct means supplying pressurized air to said air cushion and including level control valve means rigidly fixed to a first one of said links, valve actuator means for said valve means normally positioned to block the flow of pressurized air to said air cushion and the escape of air therefrom to the atmosphere thereby to support said seat unit in said neutral position, cam means movable with a second one of said links and positioned and arranged to shift said valve actuator means to admit pressurized air to said cushion when said seat unit moves downwardly away from the neutral position of said seat unit and to release pressurized air to the atmosphere when said seat unit moves upwardly away from the neutral position thereof.

10. That improvement defined in claim 9 characterized in that said cam means is manually shiftable to a plurality of different stable positions in each of which said cam means and said valve actuator means cooperate to support said seat unit in a respective neutral position at a different elevation.

11. That improvement defined in claim 2 characterized in that said level control valve means includes valve reciprocable means having a cam follower roller supported on the outer end thereof and bearing against said cam means positioned in the reciprocal path of movement of said cam follower roller as said seat unit reciprocates, said cam means being contoured to admit pressurized air to or vent air from said air cushion as necessary to support said seat substantially in said neutral position.

12. That improvement as defined in claim 11 characterized in the provision of manually adjustable means for shifting said level control valve means and said cam means relative to one another thereby to adjust the neutral position of said seat relative to said base unit.

* * * * *

UNITED STATES PATENT AND TRADEMARK OFFICE
CERTIFICATE OF CORRECTION

PATENT NO. : 4,022,411
DATED : May 10, 1977
INVENTOR(S) : Thomas R. Rumsey

It is certified that error appears in the above-identified patent and that said Letters Patent are hereby corrected as shown below:

Column 5, line 18, "delete "level control means" and insert therefor --level control valve means--.

Column 6, line 56, "valve reciprocable" should read --reciprocable valve actuator--.

Signed and Sealed this thirtieth Day of August 1977

[SEAL]

Attest:

RUTH C. MASON
Attesting Officer

C. MARSHALL DANN
Commissioner of Patents and Trademarks